United States Patent [19]

Takenouchi et al.

[11] Patent Number: 5,428,528

[45] Date of Patent: Jun. 27, 1995

[54] PORTABLE INTERACTIVE GAME SYSTEM BETWEEN MASTER/SLAVE UNITS CONTAINING DETACHABLE MEMORIES WHEREIN A MASTER UNIT DOWNLOADS A MASTER PROGRAM TO SLAVE UNITS RESPECTIVE DETACHABLE MEMORIES

[75] Inventors: Norio Takenouchi, Soraku; Setsunobu Wakamoto, Shiki; Katsuhiro Masui, Kashihara, all of Japan

[73] Assignee: Sharp Kabushiki Kaisha, Osaka, Japan

[21] Appl. No.: 750,865

[22] Filed: Aug. 28, 1991

[30] Foreign Application Priority Data

Sep. 6, 1990 [JP] Japan ................................. 2-238122

[51] Int. Cl.⁶ .......................... G06F 13/00; G06F 9/06
[52] U.S. Cl. .................... 364/410; 273/237; 395/200; 395/275; 364/230.4; 364/231.1; 364/231.2; 364/DIG. 1
[58] Field of Search ............... 273/473, 237, 269, 138; 395/200, 275, 200; 364/410, 411, 412

[56] References Cited

U.S. PATENT DOCUMENTS

| | | | |
|---|---|---|---|
| 4,051,605 | 10/1977 | Toal et al. | 434/201 |
| 4,309,030 | 1/1982 | Goldfarb et al. | 273/313 |
| 4,564,923 | 1/1986 | Nakano | 395/200 |
| 4,593,376 | 6/1986 | Volk | 364/900 |
| 4,633,430 | 12/1986 | Cooper | 395/200 |
| 4,725,977 | 2/1988 | Izumi et al. | 395/425 |
| 4,865,787 | 8/1989 | Itkis | 273/237 |
| 5,007,649 | 4/1991 | Richardson | 273/237 |
| 5,184,830 | 2/1993 | Okada et al. | 273/373 |
| 5,355,302 | 10/1994 | Martin et al. | 364/410 |

*Primary Examiner*—Thomas C. Lee
*Assistant Examiner*—Sang Hui Kim
*Attorney, Agent, or Firm*—Nixon & Vanderhye

[57] ABSTRACT

A communication processing system provided with one parent communication unit, at least one child communication unit, and at least one first detachable unit detachable from the at least one child unit, the system being operated in accordance with an operation program stored in a second detachable unit detachable from the parent unit, includes a transfer unit for transferring the operation program to the at least one child unit, a first storage unit for storing the operation program transferred from the parent unit by the transfer unit when the second detachable unit is mounted on the parent unit, the first storage unit being provided in the first detachable unit, and a second storage unit for storing a receiving program for receiving data sent from the parent unit, the second storage unit being provided in the first detachable unit. The first storage unit is provided in the first detachable unit. The second storage unit is provided in the first detachable unit.

5 Claims, 16 Drawing Sheets

PORTABLE INTERACTIVE GAME SYSTEM BETWEEN MASTER/SLAVE UNITS CONTAINING DETACHABLE MEMORIES WHEREIN A MASTER UNIT DOWNLOADS A MASTER PROGRAM TO SLAVE UNITS RESPECTIVE DETACHABLE MEMORIES

BACKGROUND OF THE INVENTION

1. Field of the Invention

The present invention relates to a communication processing system provided with two or more communication units which communicate with each other.

2. Description of the Related Art

The present inventors know a multi-player game system which is used for playing a game by two or more players. The multi-player game system includes communication processing machines respectively corresponding to the players. Each of the communication processing machines is referred to as a game machine. Each game machine has a display unit and operation keys. For the display unit, a monochrome liquid crystal display, a color liquid crystal display, or a cathode-ray tube may be used. The operation keys include cursor keys, a reset key, a start key and functional keys. The game machine allows loading and unloading of a game cassette unit. The game cassette unit provides a ROM (Read Only Memory) and a RAM (Random Access Memory). The ROM stores a game program and a data communication program which controls the game machines to communicate with each other. Since each of the game machines does not store the game program and the data communication program, this game cassette unit has to be loaded to each game machine. The game machines are connected to each other through a communication cable. The data communication program stored in the loaded game cassette unit is executed through the communication cable.

The above multi-player game system is incapable of storing the game program and the data communication program for communicating with the game machines. It is therefore necessary to load the game cassette unit to each game machine as described above. It results in requiring the same number of game cassette units as the game machines. It means that if the players would like to enjoy another game, they all have to buy new game cassette units. It is not economical. Hence, it is necessary to reduce the components needed for enjoying the game in number.

SUMMARY OF THE INVENTION

It is therefore an object of the present invention to provide a communication processing system which is capable of solving the Foregoing technical problem and reduces the components in number.

The object of the invention can be achieved by a communication processing system provided with one parent communication unit, at least one child communication unit, and at least one first detachable unit detachable from the at least one child unit, the system being operated in accordance with an operation program stored in a second detachable unit detachable from the parent unit, including:

a transfer means for transferring the operation program to the at least one child unit;

a first storage unit for storing the operation program transferred from the parent unit by the transfer unit when the second detachable unit is mounted on the parent unit, the first storage unit being provided in the first detachable unit; and a second storage unit for storing a receiving program for receiving data sent from the parent unit, the second storage unit being provided in the first detachable unit. The first storage unit is provided in the first detachable unit. The second storage unit is provided in the first detachable unit.

In operation, the second detachable unit which stores the operation program is allowed to be detachable from the parent unit. The first storage unit for storing the operation program is provided in the first detachable unit to be detachable from the at least one child unit. The operation program stored in the second detachable unit is transferred from the parent unit to the at least one child unit by the transfer unit. The operation program transferred to the at least one child unit is stored in the first storage unit in accordance with a receiving program for a process of receiving of the operation program. This receiving program is stored in the second storage unit provided in the first detachable, unit. Then, the operation program stored in the second detachable unit and the first storage unit is started to execute.

The operation program stored in the second detachable unit loaded to the parent unit is allowed to be stored in the first storage unit. It means that the necessary number of the second detachable unit is one. Hence, for changing the operation program stored in the second detachable unit, it is necessary to simply change just a single unit.

Further objects and advantages of the present invention will be apparent from the following description of the preferred embodiments of the invention as illustrated in the accompanying drawings.

DESCRIPTION OF THE PREFERRED EMBODIMENTS

Embodiments of the present invention are described hereinafter in detail with reference to the drawings.

Figure 1:
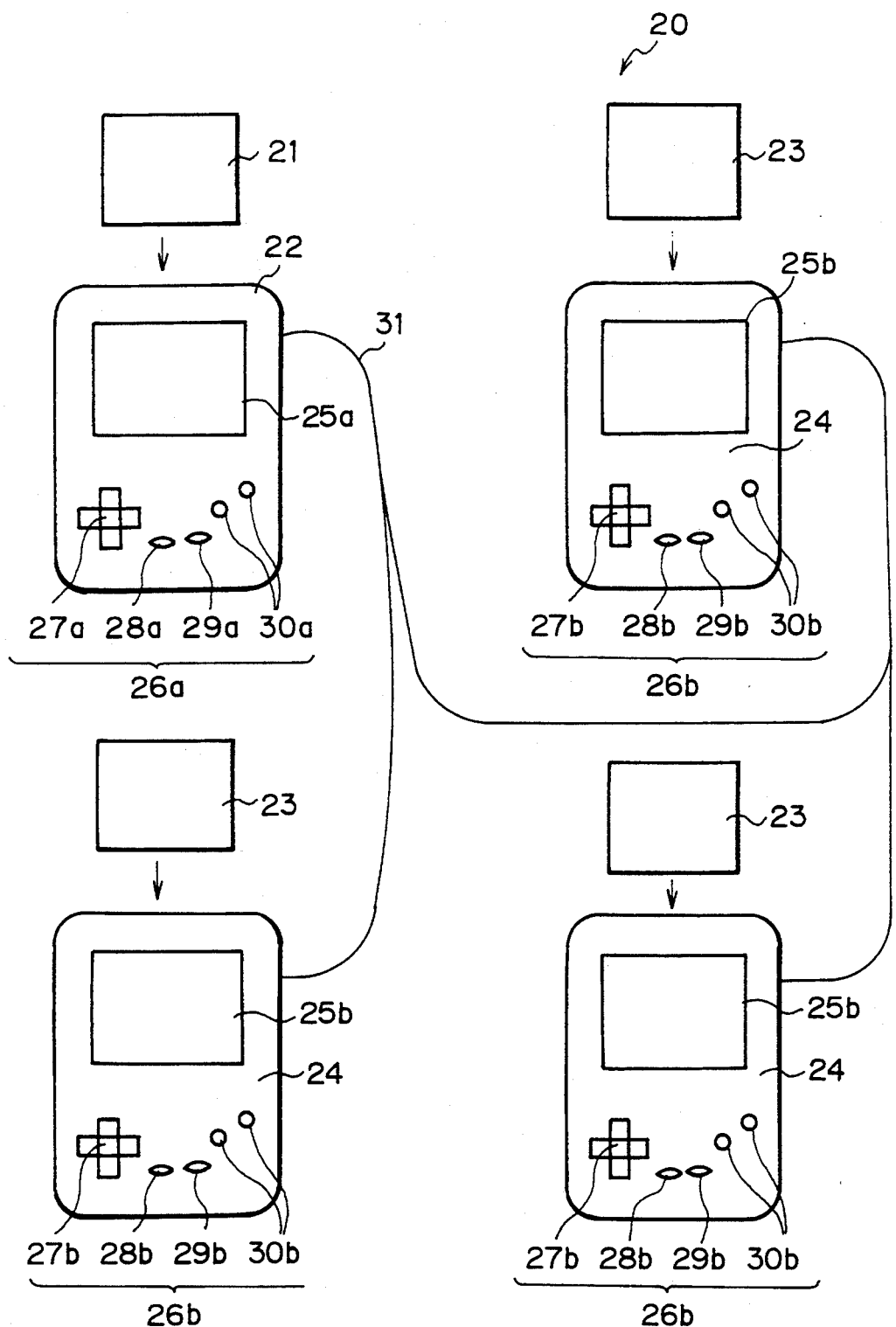
FIG. 1 is a view showing a multi-player game system according to a first embodiment of the present invention.

FIG. 1 is a view showing a multi-player game system for two or more players according to a first embodiment of the present invention.

As shown in FIG. 1, a multi-player game system 20 includes four communication units (that is, this system is prepared for four players) . The communication units will be referred to as game machines. The game machine 22 is a parent game machine to which a multi-player game cassette 21 (to be described later) is to be loaded. The remaining game machines 24 are child game machines, each of which receives a common cassette 23 for a multi-player game. The parent game machine 22 has a display unit 25a and an operation key unit 26a. For the display unit 25a, a monochrome liquid crystal display, a color liquid crystal display, or a cathode-ray tube may be used. The operation key unit 26a includes cursor keys 27a, a reset key 28a, a start key 29a, and functional keys 30a.

Each of the child game machines 24 has a display unit 25b and an operation key unit 26b. For the display unit 25b, a monochrome liquid crystal display, a color liquid crystal display, or a cathode-Fay tube may be used. The operation key unit 26b includes cursor keys 27b, a reset key 28b, a start key 29b, and functional keys 30b. The parent game machine 22 is connected to the child game machines 24 through communication cables 31.

Figure 2:
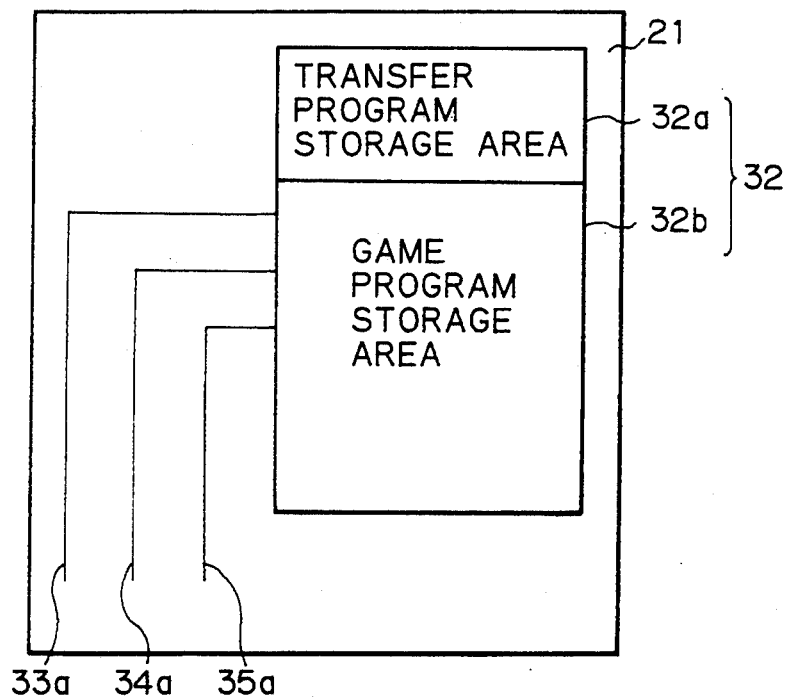
FIG. 2 is a block diagram showing a multi-player game cassette shown in FIG. 1.

FIG. 2 is a block diagram showing the multi-player game cassette 21 shown in FIG. 1.

As shown in FIG. 2, the multi-player game cassette 21 includes a storage unit 32 built therein. The storage unit 32 has a first ROM which includes a storage area 32a for storing a transfer program for transferring a multi-player game program and a second ROM which includes a storage area 32b for storing the multi-player game program. The transfer program in the storage area 32a is used for transferring the multi-player game program in the storage area 32b to the child game machines 24. In order to transfer the multi-player game program from the parent to the child game machines or data about an execution of the multi-player game program between the parent game machine 22 and the child game machines 24, the storage unit 32 is connected to the parent game machine 22 through an address bus 33a, a data bus 34a and a control signal line 35a when the multi-player game cassette 21 is loaded to the parent game machine 22.

Figure 3:
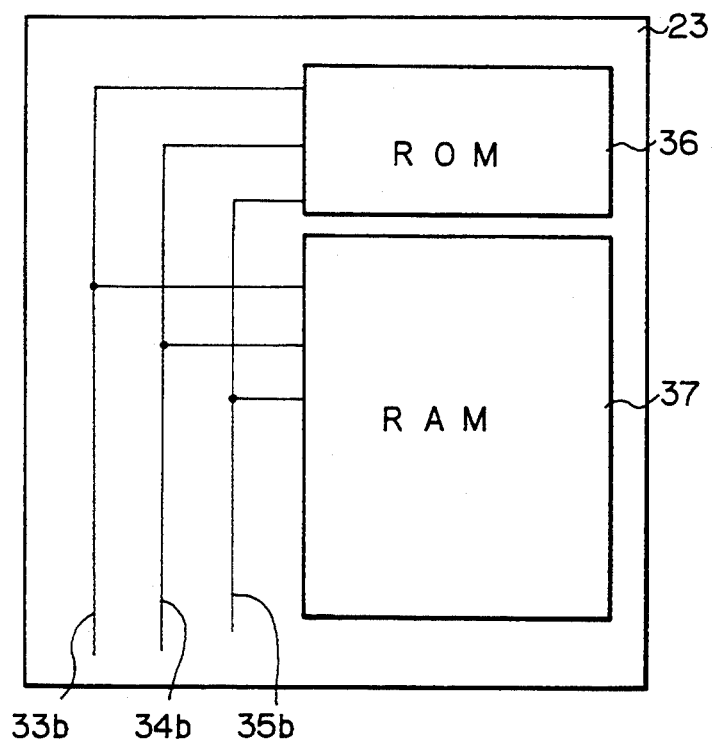
FIG. 3 is a block diagram showing one of common cassettes for a multi-player game shown in FIG. 1.

FIG. 3 is a block diagram showing one of the common cassettes 23 for the multi-player game shown in FIG. 1.

As shown in FIG. 3, each of the common cassettes 23 for the multi-player game includes a ROM 36 and a RAM 37 built therein. The ROM 36 stores a receiving program for receiving the game program stored in the multi-player game cassette 21 through the communication cables 31 when the multi-player game cassette 21 is loaded to the parent game machine 22. The RAM 37 is used for storing the game program received under the control of the receiving program. In order to receive the multi-player game program from the parent game machine 22 to which the multi-player game cassette 21 is loaded and in order to transfer the data between the parent game machine 22 and the child game machines 24 when the multi-player game program is executed, the ROM 36 and the RAM 37 are connected to each of the child game machines 24 through an address bus 33b, a data bus 34b and a control signal line 35b when each of the common cassettes 23 for the multi-player program is loaded to the each of the child game machines 24.

Figure 4:
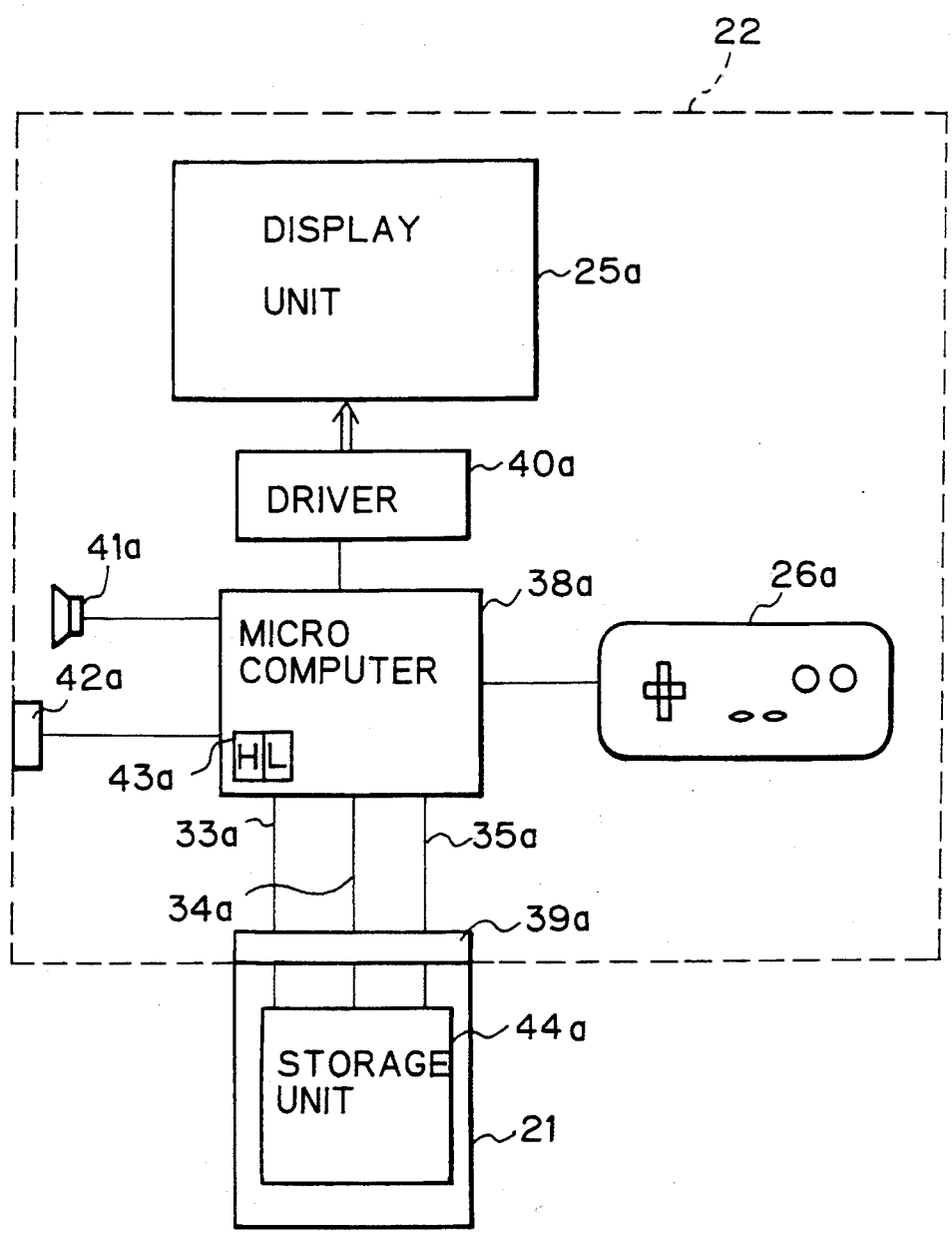
FIG. 4 is a block diagram showing an internal of a parent game machine shown in FIG. 1.
Figure 5:
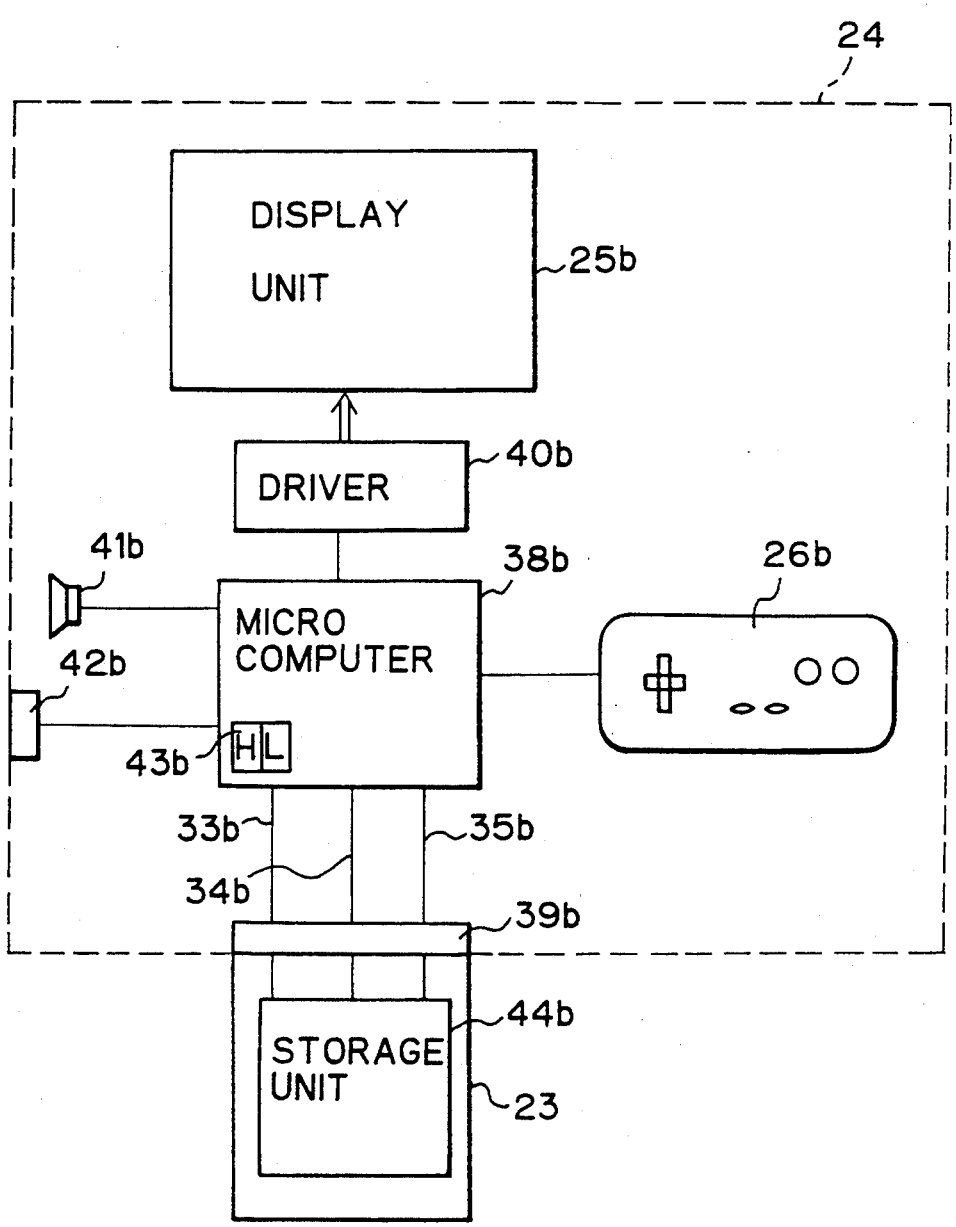
FIG. 5 is a block diagram showing an internal of each of child game machines shown in FIG. 1.

FIG. 4 is a block diagram showing the inside of the parent game machine 22 shown in FIG. 1. FIG. 5 is a block diagram showing the inside of each of the child game machines 24 shown in FIG. 1.

The only difference between the parent game machine 22 and the child game machines 24 is that the parent game machine 22 receives the multi-player game cassette 21 and each of the child game machines 24 receives each of the common cassettes 23 for the multi-player game. Both the parent and the child game machines basically have the same arrangement.

As shown in FIG. 4, the parent game machine 22 includes a microcomputer 38a and a cassette connector 39a. The microcomputer 38a is connected to the cassette connector 39a through the address bus 33a, the data bus 34a and the control signal line 35a. The multi-player game cassette 21 is detachable from the cassette connector 39a. FIG. 4 shows the state that the multi-player game cassette 21 is loaded to the cassette connector 39a. The microcomputer 38a is connected to the display unit 25a through a driver 40a served as a driving unit. The operation key unit 26a, a speaker 41a, and a communication connector 42a are all connected to the microcomputer 38a. The microcomputer 38a means in this embodiment a microprocessor or a one-chip microcomputer having a ROM or RAM built therein. The microcomputer 38a has a register HL 43a built therein. Since the microcomputer 38a does not store the multi-player game program, the microcomputer 38a operates under the control of the program stored in the multi-player game cassette 21. The microcomputer 38a serves to transfer or receive the program to the remaining child game machines 24 and to communicate the data about execution of the multi-player game program among the game machines. A storage unit 44a in the multi-player game cassette 21 includes the storage unit 32 consisting of the first ROM which includes the transfer program storage area 32a and the second ROM which includes the game program storage area 32b shown in FIG. 2.

As shown in FIG. 5, each of the child game machines 24 includes a microcomputer 38b and a cassette connector 39b. The microcomputer 38b is connected to tile cassette connector 39b through the address bus 33b, the data bus 34b and the control signal line 35b. The common cassette 23 for the multi-player program is detachable from the cassette connector 39b. FIG. 5 shows the state that one of the common cassettes 23 for the multi-player game is loaded to the cassette connector 39b. The microcomputer 38b is connected to the display unit 25b through a driver 40b served as a driving unit. The operation key unit 26b, a speaker 41b, and a communication connector 42b are all connected to the microcomputer 38b. The microcomputer 38b means in this embodiment a microprocessor or a one-chip microcomputer having a ROM or RAM built therein. The microcomputer 38b has a register HL 43b built therein. Since the microcomputer 38b does not store the multi-player game program, the microcomputer 38b operates under the control of the program stored in the corresponding one of the common cassettes 23 for the multi-player game. The microcomputer 88b serves to transfer or receive the program to the remaining parent or child game machines 22 or 24 and to communicate the data about execution of the multi-player game program among the game machines. A storage unit 44b in each of the common cassettes 23 includes the ROM 36 and the RAM 37.

Figure 6A:
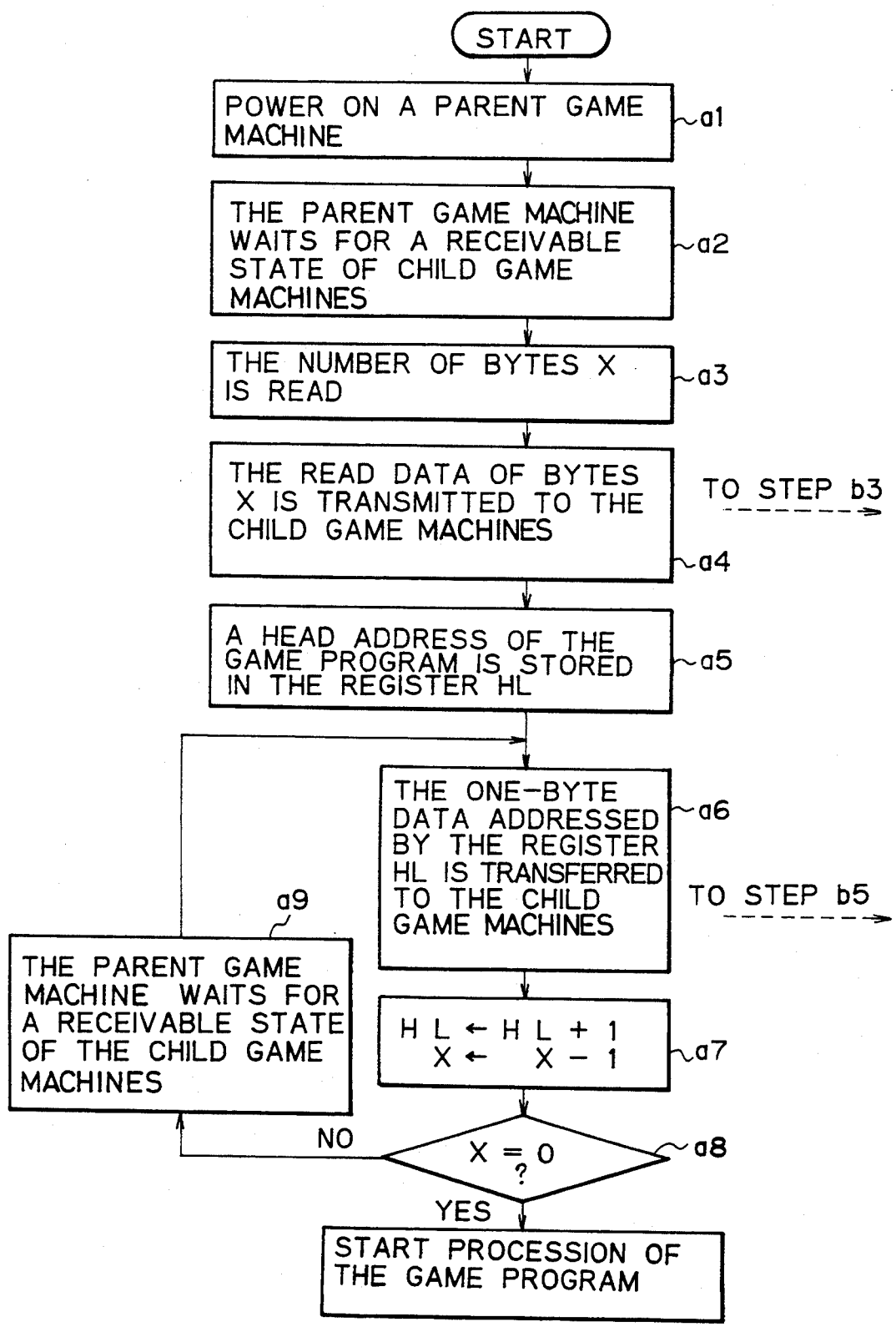
FIGS. 6A and are flowcharts showing the transfer and receive operation of the operation program done in the embodiment of the present invention.
Figure 6B:
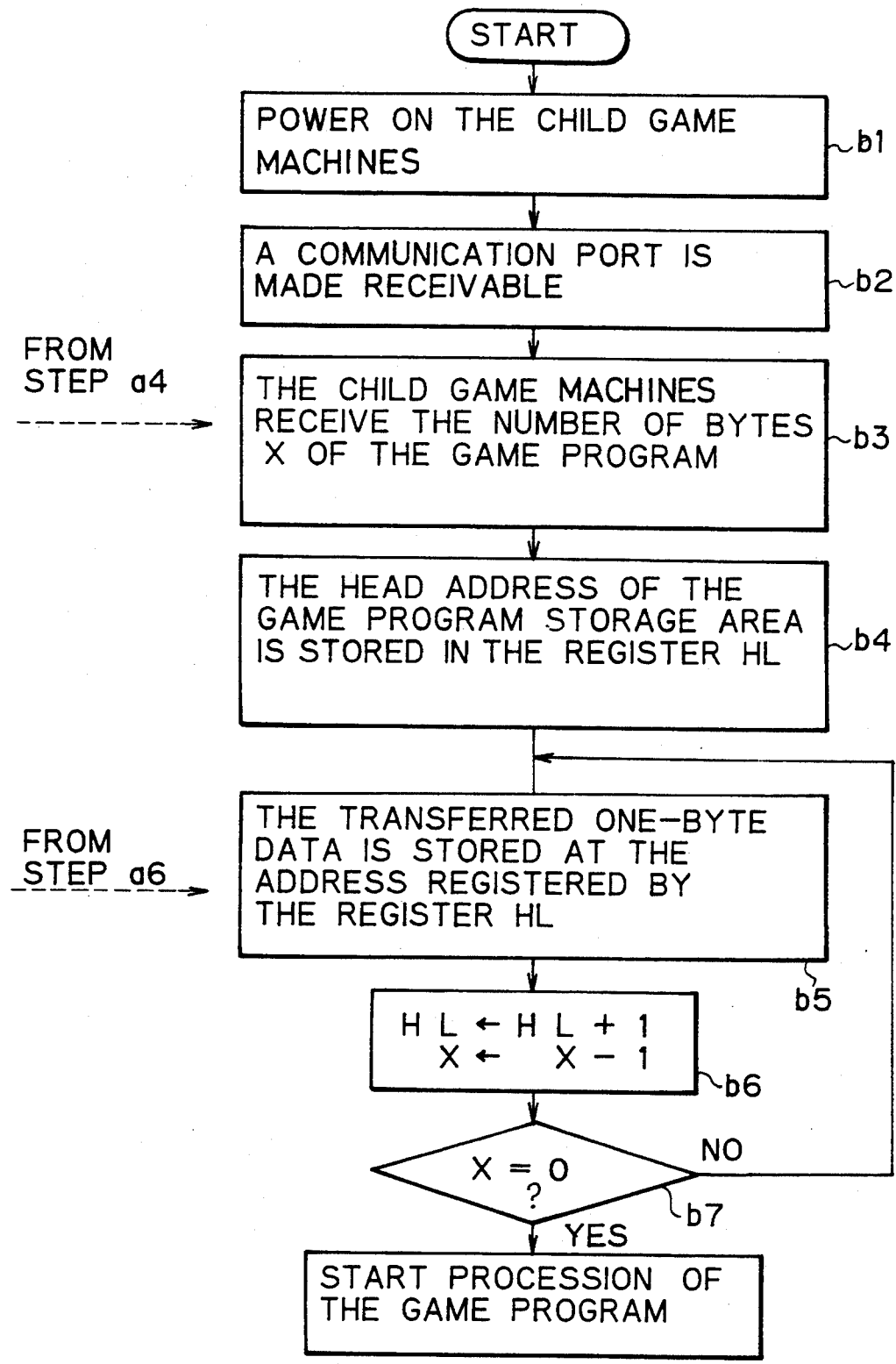

FIGS. 6A and 6B are flowcharts showing how the game program is transferred and received according to the embodiment of the present invention.

As shown in FIGS. 6A and 6B, the steps a1 to a9 concerns with the transmission of the parent game machine 22. The operation of the transmission is performed by the microcomputer 38a included in the parent same machine 22. The steps b1 to b7 concerns with the receiving of the child game machine 24. The operation of the receiving is performed by the microcomputer 38b included in the child game machines 24.

At the step a1, the parent game machine 22 is powered on. At the step a2, the parent game machine 22 is waiting for the receivable state of the child Same machines 24. The waiting time may be a few seconds. At the step a2, the parent game machine 22 reads the number of bytes X contained in the multiplayer game program of the multi-player game cassette 21. At the step a4, a data of the number of bytes X is transmitted to the child game machines 24. At the step a5, a head address of the game program is stored in the register HL 43a. At the step a6, the one-byte data addressed by the register HL is transferred to the child game machines 24. At the step a7, the register HL 43a is increased by 1 and the number of bytes X is decreased by 1. At the step a8, it is judged whether or not the number of bytes X is equal to 0 (zero). If not, at the step a9, the parent game machine 22 waits for the receivable state of the child game machines 24. Then, the process goes back to the step a6. The routine from the steps a6 to a9 is repeated until the number of bytes X reaches 0 at the step a2. When the number of bytes X reaches 0, the game program is started.

At the step b1, each of the child game machines 24 is powered on. At the step b2, a communication port included in each of the child game machines 24 is made receivable. At the step b3, the child game machines 24 respectively receive the number of bytes X of the game program transmitted from the parent game machine 22 at the step a4. At the step b4, the head address of the game program storage area is stored in the register HL 43b. At the step b5, the transferred one-byte data from the parent game machine 22 at the step a6 is stored at the address registered by the register HL 43b. At the step b6, the register HL 43b is increased by 1 and the number of bytes X is decreased by 1. At the step b7, it is judged whether or not the number of bytes X is equal to 0 (zero). If not, the process returns to the step b5. The routine from the steps b5 to b7 is repeated until the number of bytes X reaches 0 at the step b7. If the number of bytes X=0 is judged, the game program is started to be operated.

As described above, the present embodiment is arranged to transfer the game program stored in the multi-player game cassette 21 to each of the common cassettes 28 for the multi-player game under the control of the transfer program stored in the multi-player game cassette 21. The transferred game program is stored in the RAM 37 of each common cassette 23 under the control of receiving the program stored in each of the common cassettes 23. Hence, if the multi-player game cassette 21 is just one, tile game program stored in the multi-player game cassette 21 is allowed to be executed only if the common cassettes 23 for the multi-player game are loaded to each of the child game machines 24.

In the foregoing description of the first embodiment, it is assumed that the multi-player game system 20 includes one parent game machine 22 and three child game machines 24. It will be easily understood by the skilled person in this art that the total number of the game machines is not limited to four but may correspond to the number depending on the multi-player game program.

Figure 7:
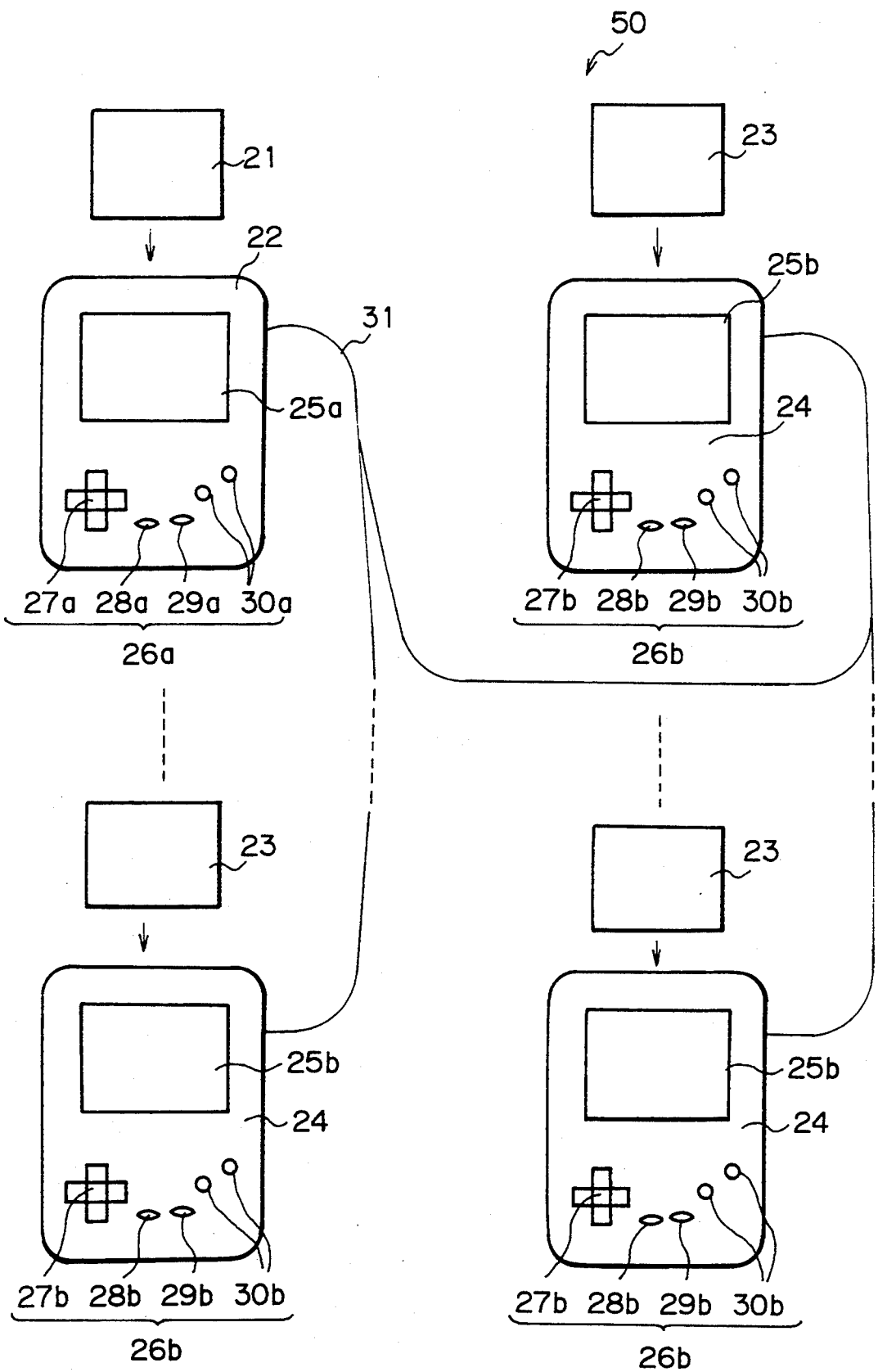
FIG. 7 is a view showing a multi-player game system according to a second embodiment of the present invention.

FIG. 7 is a view showing a multi-player game system according to a second embodiment of the present invention.

As shown in FIG. 7, a multi-player game system 50 includes one parent game machine 22 and a plurality of child game machines 24. Each of the components shown in FIG. 7 with the same numerals as ones shown in FIG. 1 means the same as the component described with reference to FIG. 1.

Figure 8:
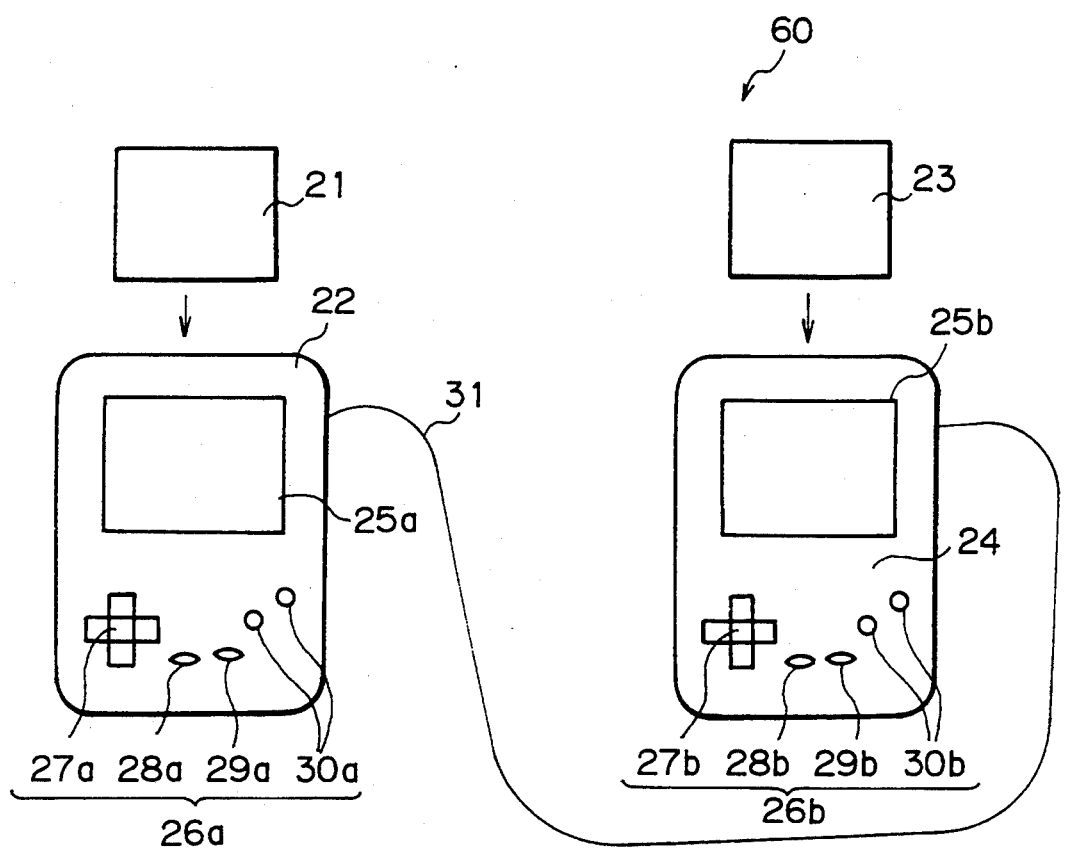
FIG. 8 is a view showing a multi-player game system according to a third embodiment of the present invention.

FIG. 8 is a view showing a multi-player game system according to a third embodiment of the present invention.

As shown in FIG. 8, a multi-player game system 60 includes one parent game machine 22 and one child game machine 24. Each of the components shown in FIG. 8 with the same numerals as ones shown in FIG. 1 means the same as the component described with reference to FIG. 1.

Figure 9:
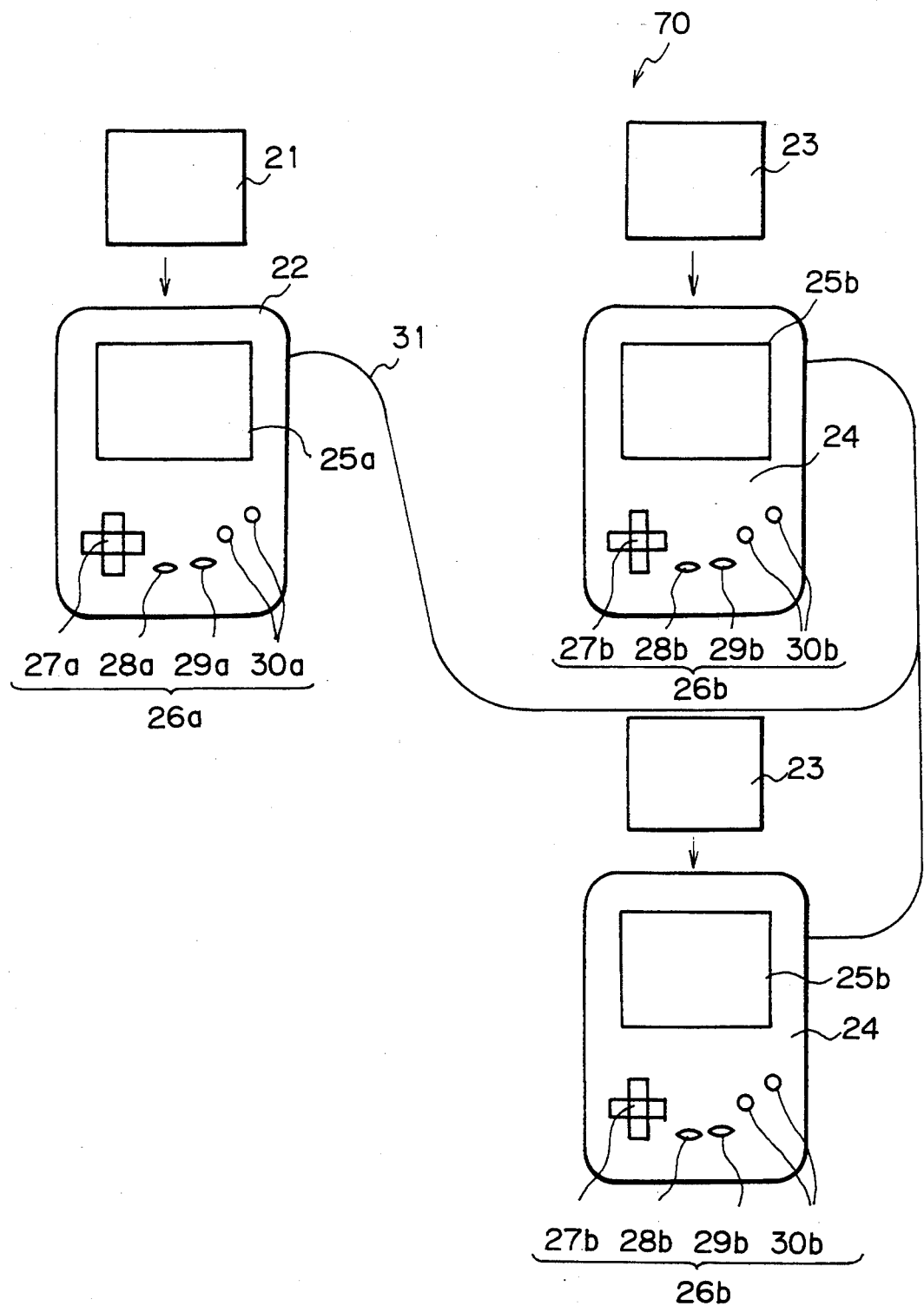
FIG. 9 is a view showing a multi-player game system according to a fourth embodiment of the present invention.

FIG. 9 is a view showing a multi-player game system according to a fourth embodiment of the present invention.

As shown in FIG. 9, a multi-player game system 70 includes one parent game machine 22 and two child game machines 24. Each of the components shown in FIG. 9 with the same numerals as ones shown in FIG. 1 means the same as the component described with reference to FIG. 1.

The foregoing arrangements of the second, third and fourth embodiments respectively provide the same effect as the foregoing first embodiment.

As described above, the game program and the transfer and receiving programs are stored in the multi-player game cassette 21 and the common cassettes 23 for the multi-player game. The microcomputer 38a and 38b shown in FIGS. 4 and 5 do not store the programs but executes those programs stored in the multi-player game cassette 21 and each of the common cassettes 23.

It is, however, possible to build the ROM for the transfer program in the microcomputer 38a included in the parent game machine 22 for the purpose of storing the transfer program in the microcomputer 38a.

Figure 10:
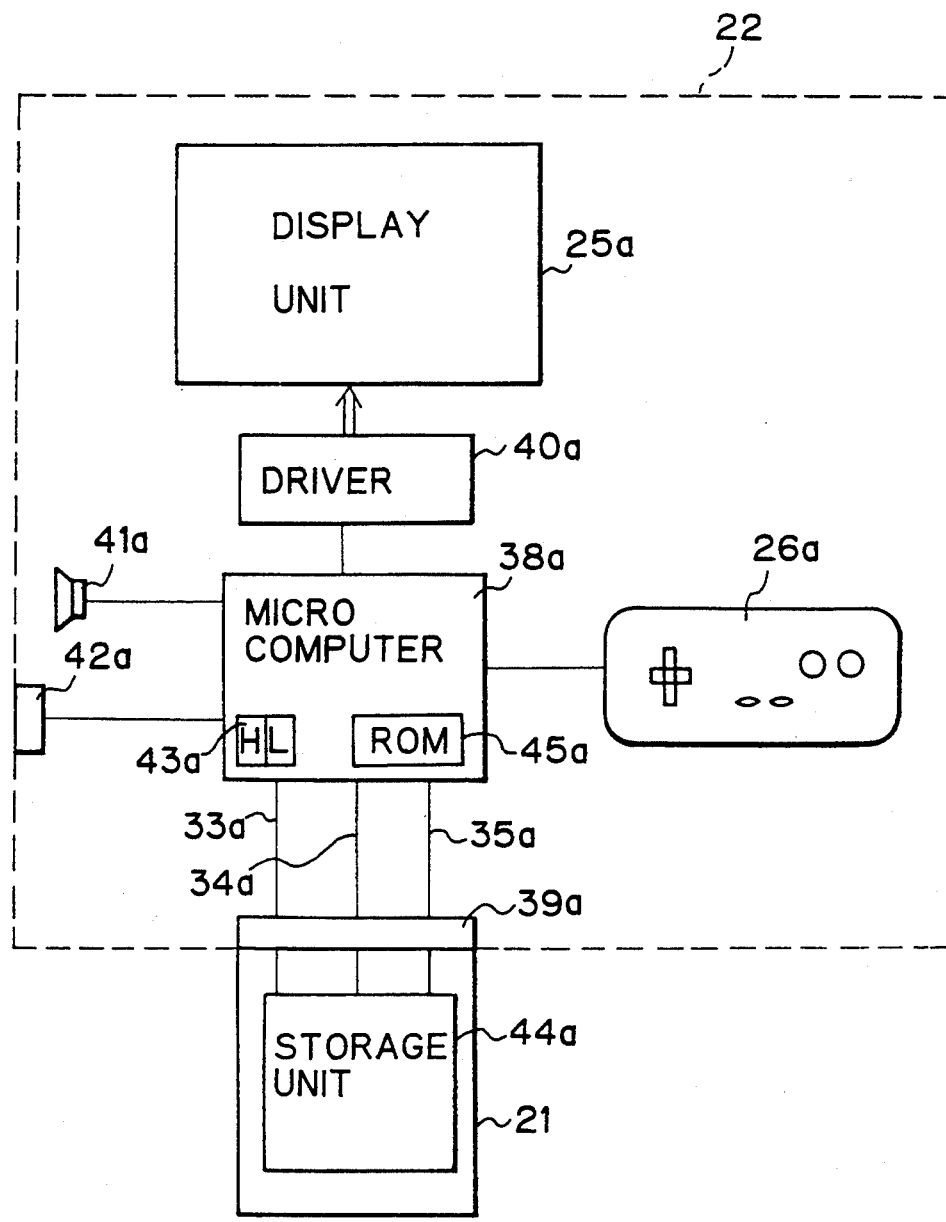
FIG. 10 is a block diagram showing an internal of a second embodiment of the parent game machine shown in FIGS. 1, 7, 8 and 9.
Figure 11:
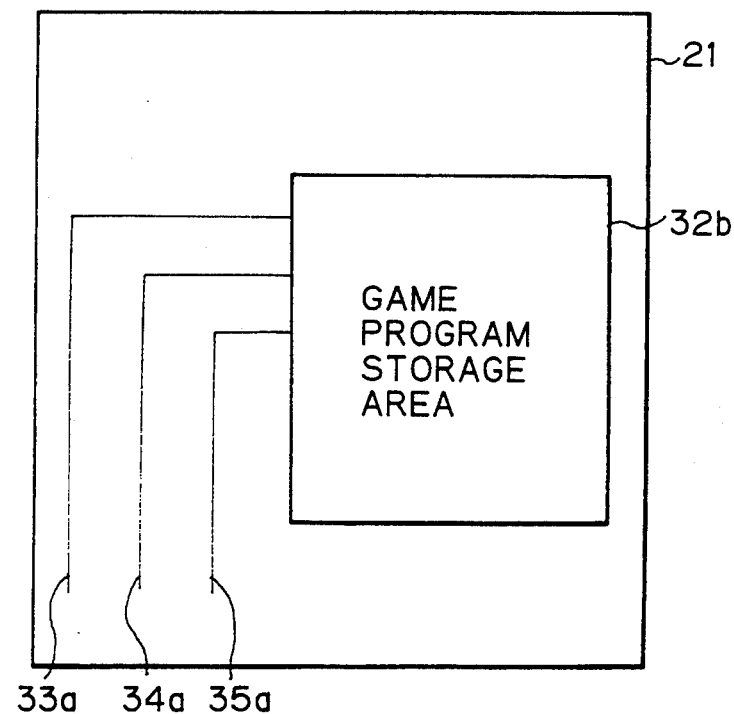
FIG. 11 is a block diagram showing a second embodiment of the multi-player game cassette shown in FIGS. 1, 7, 8 and 9.

FIG. 10 is a block diagram showing an internal of a second embodiment of the parent game machine 22 shown in FIGS. 1, 7, 8 and 9. FIG. 11 is a block diagram showing a second embodiment of the multi-player game cassette 21 shown in FIGS. 1, 7, 8 and 9. Each of the components shown in FIGS. 10 and 11 with the same numerals as ones shown in FIGS. 4 and 2 means the same as the component described with reference to FIGS. 4 and 2.

As shown in FIGS. 10 and 11, the microcomputer 38a includes a ROM 45a for storing the transfer program. It results in eliminating the transfer program storage area 32a of the storage unit 32 shown in FIG. 2 which is included in the multi-player game cassette 21. So, in this case the storage unit 32 only has the game program storage area 32b accordingly.

Likewise, it is also possible to build the ROM for the receiving program in the microcomputer 38b of the child game machine 24 for the purpose of storing the receiving program in the microcomputer 38b.

Figure 13:
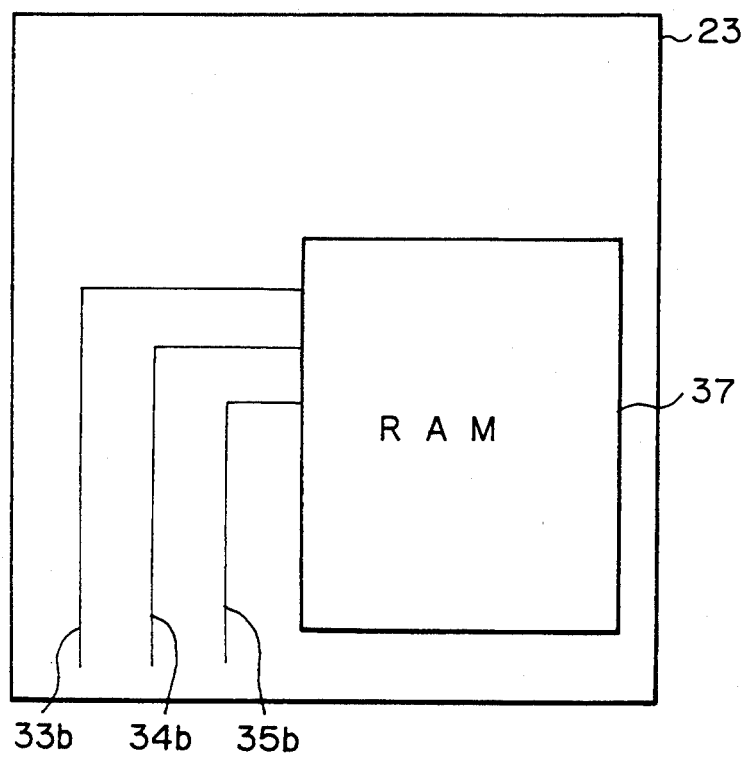
FIG. 13 is a block diagram showing an internal of a second embodiment of one of the common cassettes shown in FIGS. 1, 7, 8 and 9.
Figure 12:
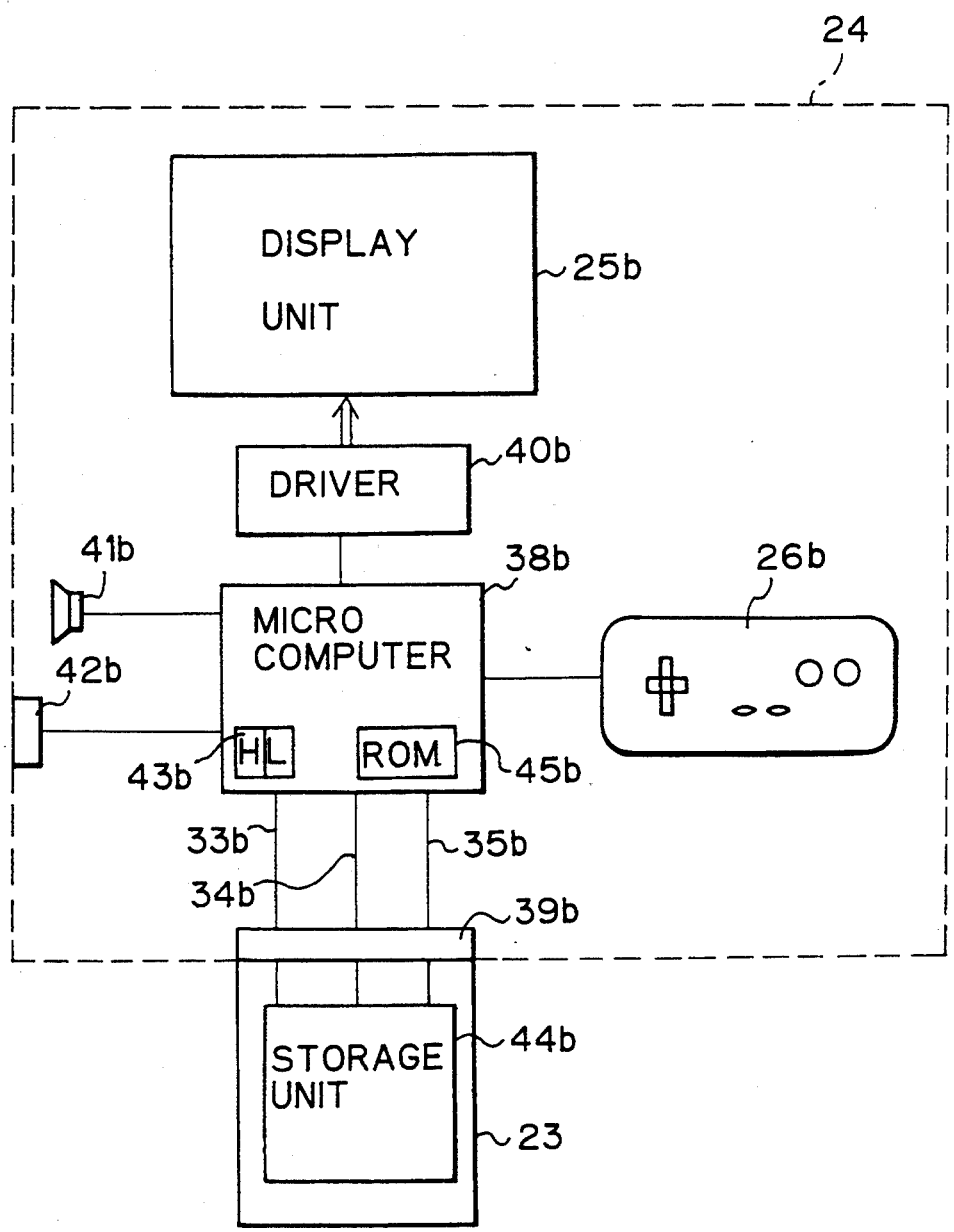
FIG. 12 is a block diagram showing an internal of a second embodiment of each of the child game machines shown in FIGS. 1, 7, 8 and 9.

FIG. 12 is a block diagram showing an internal of a second embodiment of each of the child game machines 24 shown in FIGS. 1, 7, 8 and 9. FIG. 13 is a block diagram showing an internal of a second embodiment of one of the common cassettes 23 shown in FIGS. 1, 7, 8 and 9. Each of the components shown in FIGS. 12 and 13 with the same numerals as ones shown in FIGS. 9 and 3 means the same as the component described with reference to FIGS. 5 and 3.

As shown in FIG. 12, the microcomputer 38b includes a ROM 45b for storing the receiving program. It results in reducing the storage area of the ROM 36 included in each of the common cassettes 23 as shown in FIG. 3. That is, as shown in FIG. 13, the necessary area is only the RAM 37 for storing the game program.

Figure 14:
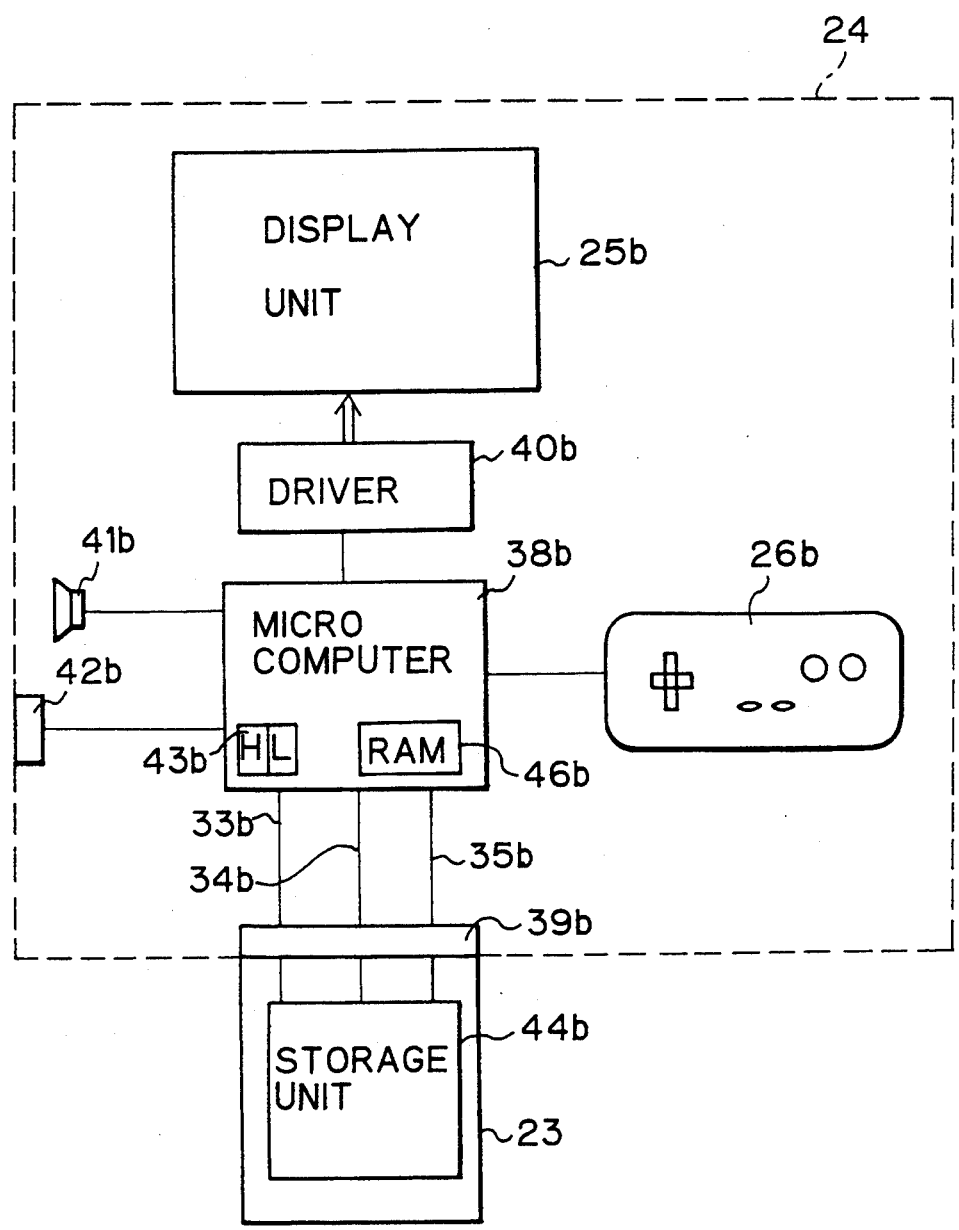
FIG. 14 is a block diagram showing an internal of a third embodiment of each of the child game machines shown in FIGS. 1, 7, 8 and 9.

FIG. 14 is a block diagram showing an internal of a third embodiment of each of the child game machines shown in FIGS. 1, 7, 8 and 9. Each of the components shown in FIG. 14 with the same numerals as ones shown in FIG. 5 means the same as the component described with reference to FIG. 5.

Figure 15:
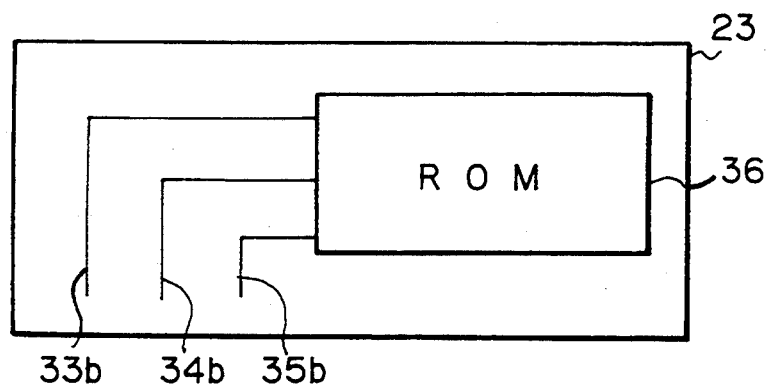
FIG. 15 is a block diagram showing an internal of a third embodiment of one of common cassettes for a multi-player game shown in FIGS. 1, 7, 8 and 9.

FIG. 15 is a block diagram showing an internal of a third embodiment of one of common cassettes for a multi-player game shown in FIGS. 1, 7, 8 and 9. Each of the components shown in FIG. 15 with the same numerals as ones shown in FIG. 3 means the same as the component described with reference to FIG. 3.

Further, as shown in FIGS. 14 and 15, in case that the microcomputer 38b of the child game machine 24 has a RAM 46b for storing the game program, it results in reducing the storage area of the RAM 37 included in each of the common cassettes 23 shown in FIG. 3. That is, as shown in FIG. 15, the necessary area is only the ROM 38 for storing the receiving program.

Figure 16:
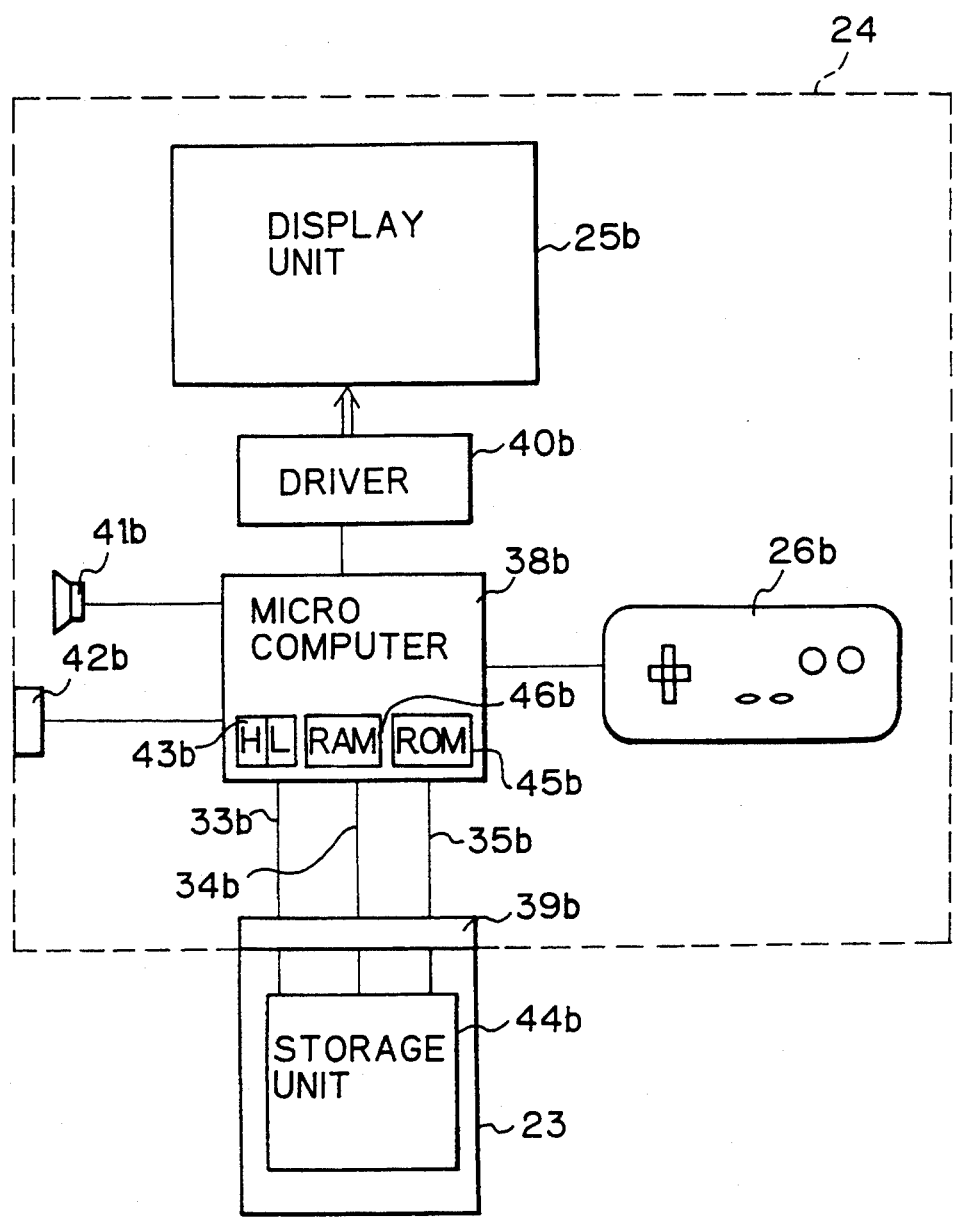
FIG. 16 is a block diagram showing an internal of a fourth embodiment of each of the child game machines shown in FIGS. 1, 7, 8 and 9.

FIG. 16 is a block diagram showing an internal of a fourth embodiment of each of the child game machines shown in FIGS. 1, 7, 8 and 9. Each of the components shown in FIG. 16 with the same numerals as ones shown in FIGS. 5, 12 and 14 means the same as the component described with reference to FIGS. 5, 12 and 14.

Figure 17:
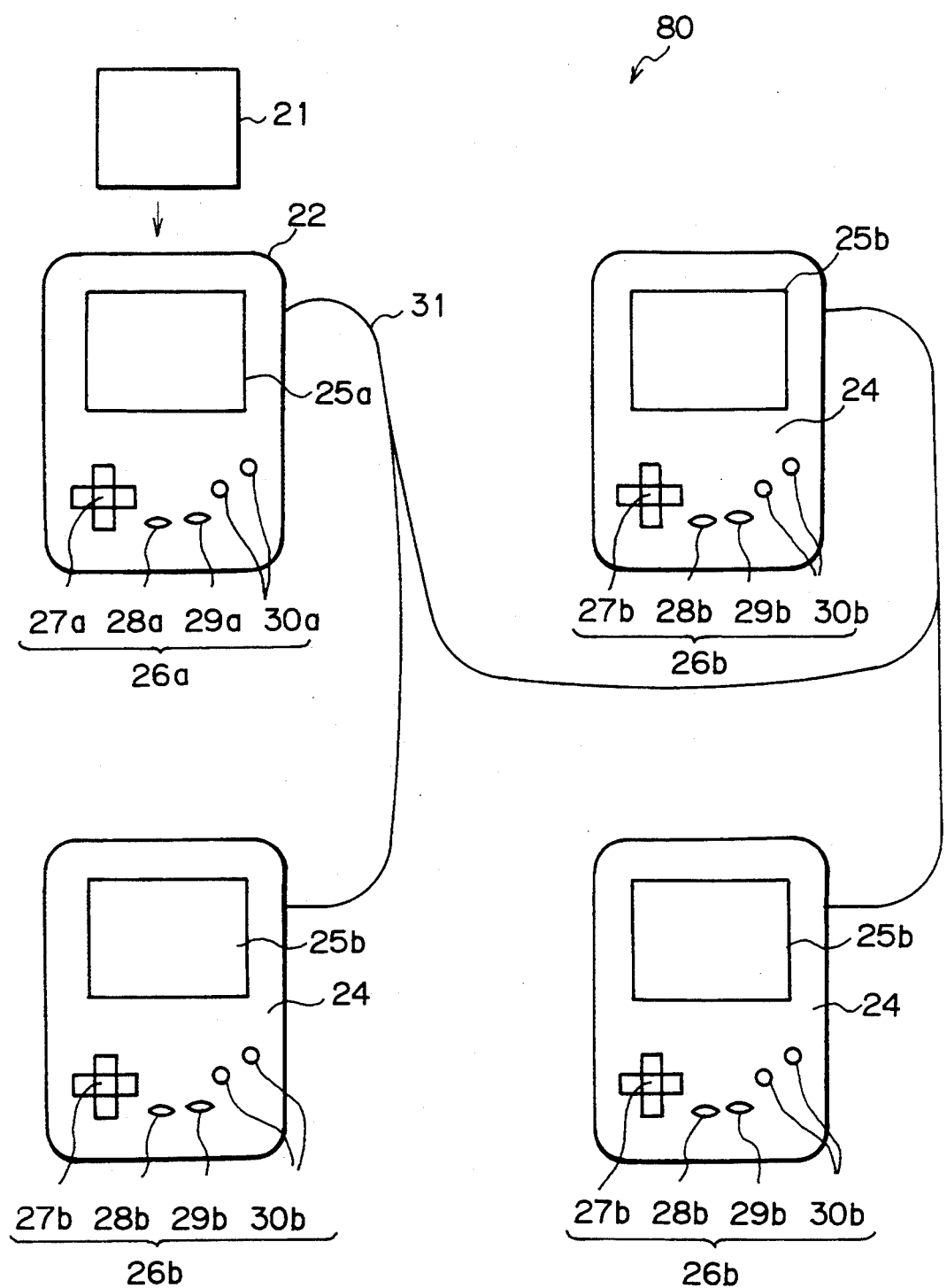
FIG. 17 is a view showing a multi-player game system according to a fifth embodiment of the present invention.

FIG. 17 is a view showing a multi-player game system according to a fifth embodiment of the present invention. Each of the components shown in FIG. 17 with the same numerals as ones shown in FIG. 1 means the same as the component described with reference to FIG. 1.

As shown in FIG. 16, in case that the, microcomputer 38b of the child game machine 24 has a ROM 45b for the receiving program and a RAM 46b for storing the game program, it results in eliminating the necessity of the common cassettes 23 for the multi-player game. That is, as shown in FIG. 17, a multi-player game system 80 have no common cassette.

The foregoing arrangement of the fifth embodiment provide the same effect as the foregoing first to fourth embodiments.

According to the foregoing arrangements, the game program stored in the multi-player game cassette 21 is allowed to be transferred to the child game machines 24 under the control of the transfer program stored in the multi-player game cassette 21 or the parent game machine 22 itself. The transferred game program is allowed to be stored in the program storage area of each of the common cassettes 28 for the multi-player game or the child game machines 24 itself under the control of the receiving program stored in each of the common cassettes 23 or the child game machines 24. To change the kind of the game program, the present invention makes it necessary to prepare just one multi-player game cassette 21 without having to prepare the same number of multi-player game cassettes 21 as the players. The present invention thus provides the multi-player game system having a more simplified arrangement.

Many widely different embodiments of the present invention may be constructed without departing from the spirit and scope of the present invention. It should be understood that the present invention is not limited to the specific embodiments described in the specification, except as defined in the appended claims.

What is claimed is:

1. A communication processing system for coordinating play of an interactive, plural player game, comprising:

a portable parent communication game unit having a parent processor and a first detachable memory for storing an interactive, plural player game program including game instructions and game data and a transfer program for transferring the interactive, plural player game program to another game unit, said game and transfer programs being executed by the parent processor;

a portable child communication game unit connected to the parent game unit via an electric cable and having a child processor and a second detachable memory for storing a receiving program for receiving and storing the interactive, plural player game program transferred from the parent game unit, the receiving and game programs being executed by the child processor;

wherein when the communication processing system is activated and the first and second detachable memories are inserted into the parent and child communication game units, respectively, the parent processor permits the parent game unit to transfer the interactive, plural player game program to the second detachable memory of the child game unit in accordance with the transfer program and the child processor permits the child game unit to receive and store the interactive, plural player game program transferred in the second detachable memory in accordance with the receiving program, and wherein the parent and child processors both execute the interactive, plural player game program to permit a player interactively operating the parent communication game unit and another player interactively operating the child communication game unit to participate in an interactive, plural player game.

2. The communication processing system according to claim 1, wherein only the first detachable memory permanently stores the interactive, plural player game program.

3. The communication processing system according to claim 1, further comprising:

plural child communication game units connected to the parent game unit, each child communications game unit having a corresponding second detachable memory.

4. The communication processing system according to claim 1, wherein each of the parent and child game units is held in a player's hand during game play.

5. The communication processing system according to claim 1, wherein the parent and child game units each further include a display and keys operable by a player to simultaneously participate in the interactive, plural player game.

* * * * *